United States Patent
Mahanta

(10) Patent No.: US 12,461,722 B2
(45) Date of Patent: Nov. 4, 2025

(54) ISOLATED ENVIRONMENTS FOR ENTERPRISE RESOURCE PLANNING MODULES

(71) Applicant: SAP SE, Walldorf (DE)

(72) Inventor: Prabal Mahanta, Bangalore (IN)

(73) Assignee: SAP SE, Walldorf (DE)

( * ) Notice: Subject to any disclaimer, the term of this patent is extended or adjusted under 35 U.S.C. 154(b) by 216 days.

(21) Appl. No.: 18/379,641

(22) Filed: Oct. 12, 2023

(65) Prior Publication Data

US 2025/0123824 A1    Apr. 17, 2025

(51) Int. Cl.
| | |
|---|---|
| G06F 9/445 | (2018.01) |
| G06F 8/41 | (2018.01) |
| G06F 8/61 | (2018.01) |
| G06F 8/71 | (2018.01) |
| G06F 8/77 | (2018.01) |
| G06F 9/455 | (2018.01) |
| G06F 17/00 | (2019.01) |

(52) U.S. Cl.
CPC ............. *G06F 8/433* (2013.01); *G06F 8/71* (2013.01)

(58) Field of Classification Search
CPC ... G06F 8/433; G06F 8/71; G06F 8/33; G06F 16/13; G06F 8/36; G06F 8/751; G06F 8/73; G06F 21/565; G06F 21/554; G06F 21/566
See application file for complete search history.

(56) References Cited

U.S. PATENT DOCUMENTS

| | | | |
|---|---|---|---|
| 10,083,027 B2 * | 9/2018 | Moorthi ................... | G06F 8/71 |
| 11,403,337 B2 | 8/2022 | Mahanta et al. | |
| 11,422,797 B1 | 8/2022 | Zhang et al. | |
| 12,260,204 B2 * | 3/2025 | Bregman ................. | G06F 8/71 |
| 2016/0350081 A1 | 12/2016 | Kumar et al. | |

OTHER PUBLICATIONS

Extended European Search Report, dated Feb. 21, 2025, issued in corresponding European Patent Application No. 24199522.4. 10 pages.

* cited by examiner

*Primary Examiner* — Thuy Dao
(74) *Attorney, Agent, or Firm* — Klarquist Sparkman, LLP

(57) ABSTRACT

Isolated environments for development of modules of a software system, such as an enterprise resource planning (ERP) system, can be generated using a container image generated from a copy of a central development environment. A graph-based machine learning model can be trained and applied to a graph of the software system to predict dependencies between the modules of the software system. An isolation forest machine learning model can be trained and applied to a selected module to verify its integrity. The container image can be modified based on the predicted dependencies and the integrity verification, among other factors. The modified container image can be executed to generate an isolated environment for the selected module. A version management utility and a transport system can be used during subsequent development in the isolated environment to manage and register repositories and objects associated with the isolated environment.

20 Claims, 11 Drawing Sheets

ISOLATED ENVIRONMENTS FOR ENTERPRISE RESOURCE PLANNING MODULES

FIELD

The field generally relates to development environments for software modules.

BACKGROUND

Provisioning containerized modules within an enterprise resource planning (ERP) system can be challenging. Traditional approaches involve complex and manual configuration processes that are time-consuming and prone to human errors. As the number of modules in the ERP system and their interdependencies grow, the complexity further increases.

Resource optimization is a critical concern, as efficient allocation of resources such as CPU and memory is essential for optimal performance. Inefficient resource allocation can lead to performance bottlenecks, underutilization, or overspending on infrastructure.

Security risks are also a significant consideration when provisioning ERP modules. The sensitive nature of the data handled by these modules demands robust security measures. Inadequate access control, network segmentation, or data isolation can result in unauthorized access, data breaches, and potential regulatory non-compliance. Furthermore, with the introduction of more stringent data protection regulations in certain jurisdictions (e.g., the General Data Protection Regulation (GPDR) recently passed in the European Union), organizations must handle personal data responsibly and comply with strict regulations. Provisioning ERP modules must address such data protection requirements, such as data isolation, encryption, anonymization, and secure data erasure.

Further, scalability and agility are crucial factors for businesses in today's rapidly evolving landscape. The ability to quickly provision and scale ERP modules can be important in order to meet changing demands and drive growth. However, traditional manual processes can hinder agility and limit scalability, leading to delays in deployment and hindering business growth.

DETAILED DESCRIPTION

Example 1—Overview

Figure 1:
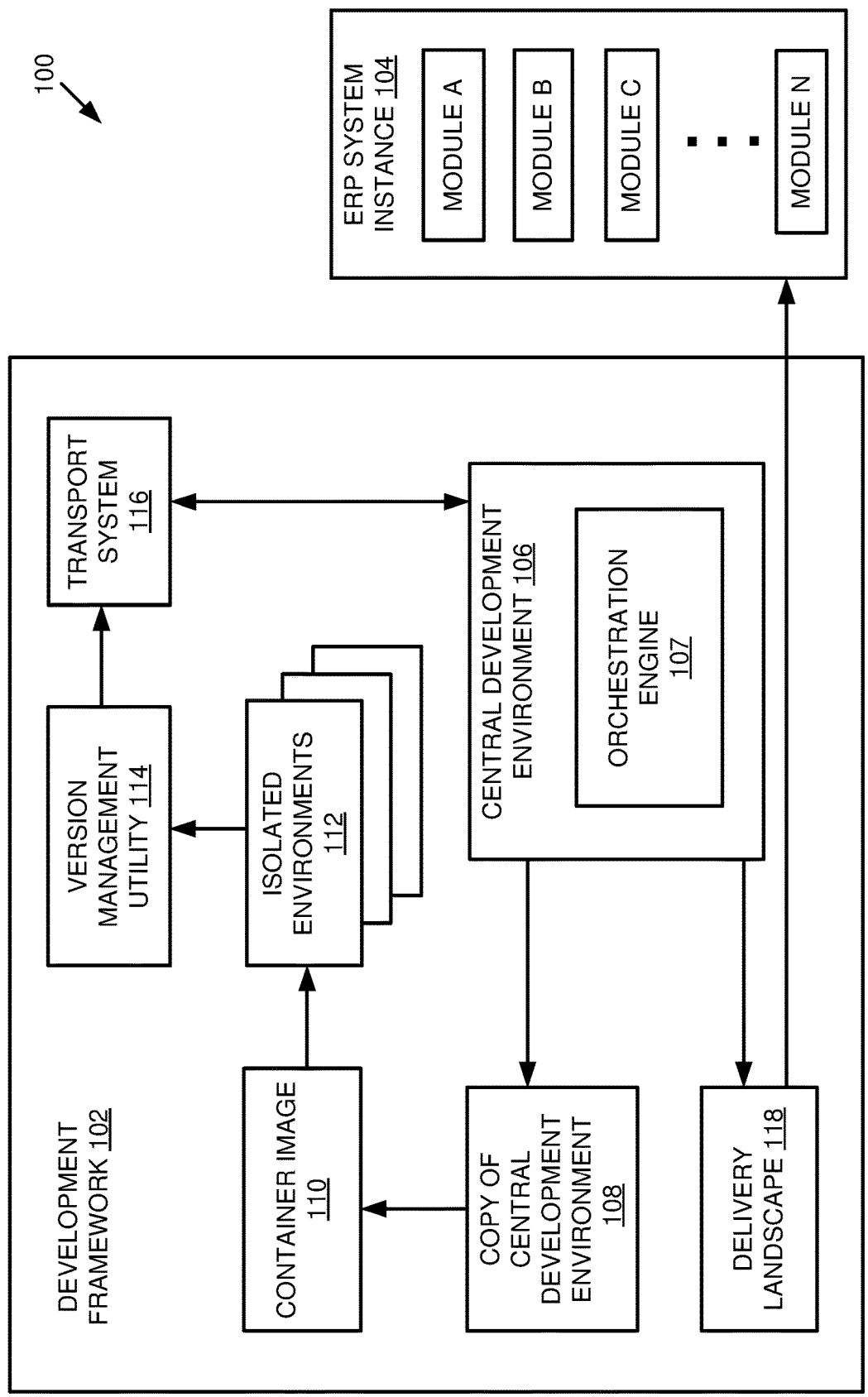
FIG. 1 is a block diagram of an example system implementing isolated environments for ERP modules.

A typical ERP system includes a plurality of modules which can be packaged together within individual instances of the ERP system. The development process for the modules includes a coding and configuration stage carried out in a central environment, typically involving numerous developers (e.g., thousands of developers). Following the coding and configuration stage, modules are sent to a qualification environment in the configurations are activated/enabled and testing is performed. Once testing has verified that the modules meet the requirements, the modules are sent to a delivery landscape.

During the coding and configuration stage, multiple different developers may need to work on the same portion of code to complete their assigned tasks. For example, a first developer may be tasked with developing a package that includes a first object, among other objects. At the same time, a second developer may be tasked with developing a different package that happens to also includes the first object, among other objects. In existing techniques, the first object will be locked under the transport of the first developer until the first developer finishes modifying the object and releases their transport (e.g., releases their changes to the object from the development environment to the qualification environment). Accordingly, the second developer will have to wait until the first developer releases their transport before being able to work on the first object, which can take multiple days or even weeks.

To avoid such delays, the techniques described herein incorporate containerization and machine learning techniques to create isolated environments in which developers can work on the same objects in parallel. The process of creating the isolated environments includes predicting module dependencies, verifying module integrity, and modifying a container image used to generate the isolated environments based on the predicting and verifying. The prediction of the module dependencies can be performed using a graph-based machine learning model, whereas the verification of module integrity can be performed by applying an isolation forest machine learning model. Modernization recommendations for the modules of the ERP system can also be generated using another machine learning model.

The described technologies thus offer considerable improvements over conventional techniques for ERP module development in which development is subject to time-consuming bottlenecks when multiple developers must work on the same module.

In some examples, an ERP system can be mapped to a microservices-based architecture, in which each microservice is representative of a different workflow within the ERP system. The microservice representation can then be evaluated with data to understand the coupling between the microservices. A single container image can be generated which represents the microservices-based architecture of the ERP system, which in turn can be served as a system for consumption by an endpoint using container technology.

While examples specific to ERP systems are discussed herein, the disclosed techniques can also be applied to other types of software systems.

Example 2—Overview of Container Technology

The term "container", as is commonly used in the field, refers to a computing environment which, during execution, at least partially isolates an application's view of an underlying operating system and/or resources. As used herein, the term "container" may be used to refer to either the running environment (e.g., during execution), or to the data structures or configurations that are used to define or build the running environment (e.g., as static data apart from execution). The term "container configuration" is used to refer to the container data structures or configurations that are used to build a container (e.g., during execution). For example, a Dockerfile is an example of a container configuration. The Dockerfile contains instructions that are used to build a container. The term "isolated environment," as used herein, refers to a specific type of container which is implemented in the manner described herein.

A "container image" also defines a container insomuch as, and as is known in the art, a container image may be built from a running container to include components defined by the running container during execution. A container image is static data defining a container and the container's components. In some embodiments, a container image may be built from a running container (e.g., a static image created based on the components loaded and/or executed within the container). In some embodiments, a container image may be built from a container configuration (e.g., from a Dockerfile). Because a container image is static data defining a container, a container image is also referred to herein as a container configuration (e.g., one type of a container configuration).

The term "container build", as used herein, refers to the construction of a container during execution. As is known in the art, a container may be built in layers during execution by starting various components in a particular order. A container build may be performed "manually" by, for example, a developer or a systems administrator starting one component at a time within the container, or the container build may be "scripted", or built as defined by a container configuration such as a Dockerfile. In other words, a container configuration such as a Dockerfile, inter alia, defines the components and order of execution of those components during build (e.g., during "start-up" execution of the container), and thus a container build results in a "running container".

Example 3—Example System Implementing Isolated Environments for ERP Modules

FIG. 1 illustrates a computing environment 100 in which disclosed technologies can be implemented. The computing environment 100 includes a development framework 102 and an ERP system instance 104. The development framework 102 can perform functions for development of the ERP system instance 104. While the example describes an instance of an ERP system in particular, the instance can be an instance of another type of software system.

ERP system instance 104 includes a plurality of modules, represented in the example as Modules A, B, C . . . N. Examples of ERP system modules include an enterprise planning and project management (EPPM) module, a finance (FIN) module, a quote to cash (Q2C) module, etc. Each module can be associated with a plurality of different end-to-end business scenarios. One example of an ERP system is the SAP S/4HANA Cloud, public edition software available from SAP SE of Walldorf, Germany.

Development framework 102 includes a central development environment 106. The central development environment 106, which can alternatively be referred to as a central system or a consolidation system, is where development activities would be carried out by multiple developers in a typical development framework. However, as discussed above, this can cause undesirable delays due to the inability of multiple developers to work on the same portion of code (e.g., object) in parallel. To avoid such issues, container technology is used to create isolated environments within development framework 102 in which developers can work independently, in parallel, on any portion of code. In the example, central development environment 106 includes an orchestration engine 107.

In order to create the isolated environments, a copy 108 of the central development environment 106 is made. The copy 108 of the central development environment 106 can be generated via a backup process at predetermined intervals, e.g., nightly or weekly. For example, backup files in Unix format of the modules stored in the central development environment can be created during the backup process.

A container image 110, e.g., a Docker image, is then generated based on the copy 108 of the central development environment 106. For example, once the backup files have been created, a Hypertext Transfer Protocol (HTTP) call can be made to orchestration engine 107. The orchestration engine 107 can be used to create a new container that maps the core modules. Further, the orchestration engine 107 can use configuration scripts to prepare the container for testing and development. After validation of the container has been performed, the container image 110 can be committed as an image containing the operating system and pushed into configured registries and persisted volumes in cloud clusters.

Container image 110 can be a file used to execute code in a container (e.g., a Docker container). In practice, the container image can include static data defining a container which encompasses a portion of the central development environment and its contents (e.g., a single module of the central development environment). Accordingly, container image 110 can a function as a template for building a container system. In particular, container image 110 can include application code, configuration files, environment variables, libraries, runtimes, tools, dependencies, and other files associated with the corresponding portion of the central development environment 106.

One or more isolated development environments 112 can be generated based on container image 110. The isolated development environments 112 are referred to simply as isolated environments herein, for the sake of brevity. For example, the container image 110 can be executed to construct one or more isolated environments 112, which can be similar to Docker systems. Each isolated environment 112 can be a virtualized runtime environment which is used to create, run, and deploy applications in an isolated environment (e.g., an environment that is isolated from the central development environment 106), similar to a virtual machine.

In some examples, each isolated environment 112 corresponds to and encompasses one module of the ERP system. In other examples, a given isolated environment 112 can correspond to and encompass a different portion of code for the ERP system instance, e.g., a single object, a package of multiple objects, multiple modules, or all of the modules of the ERP system. A given isolated environment 112 can be used by a single developer, or a team of developers, to develop the corresponding portion of code for the ERP system.

Each isolated environment 112 can be associated with a repository as well as one or more objects. Development framework 102 can further include an external code repository that implements a version management utility 114. Version management utility 114 can perform version management for the repositories and objects. One example of a version management utility 114 is GitHub, which is a web-based code repository hosting service with distributed revision control and source code management functionality.

Version management utility 114 can be used in conjunction with a transport system 116. In particular, transport system 116, which can be a Git-enabled transport mechanism, can be used to register the repositories and objects associated with the isolated environments 112. For example, for an isolated environment corresponding to a module comprising a package of multiple objects, the transport system can register each object. The version management utility can then be used to create "branches," which can allow multiple developers to work in parallel on the same object. After completing their work on the object, the developers can each perform certain checks on the object and then release the object from their transport to return it to the central development environment. Accordingly, in examples where multiple developers (e.g., a team of developers) work in the same isolated environment 112, the version management utility 114 can be used to create branches within the code. Each of the multiple developers can work on a respective one of the branches in parallel within the same isolated environment 112.

For example, branches can be created which correspond to respective use scenario requirements, and developers can collaborate in the branches. Further, each branch can be carved out as a development environment and served as a container system in which developers can develop risky changes. Once they are done, the developers can commit their changes back to the repository and use code reviews to merge it back to the main branch. To maintain consistency, the changes can be merged back into the central development environment 106.

In some examples, in addition to the developers working in the isolated environments, one or more developers may choose to instead develop their code in the central development environment 106. Accordingly, as shown, the central development environment 106 is also directly linked with the transport system 116 such that code (e.g., objects) developed in the central development environment can also be locked in transport and released from transport as appropriate, to avoid conflicts.

Development framework 102 further includes a delivery landscape 118. Central development environment 106 transmits code received from the isolated environments 112 to delivery landscape 118. The code can then be conveyed from delivery landscape 118 to the customer for implementation in the ERP system instance 104.

In contrast to existing development frameworks in which certain steps (e.g., activation of configurations and end-to-end/performance testing) are performed in a separate qualification environment prior to the code being transmitted to a delivery landscape for quality gate simulation and delivery, each isolated environment 112 can advantageously incorporate the functionality of a qualification environment as well as certain functionality typically performed in the delivery landscape. Towards this end, activation of configurations, qualification, testing, and quality gate simulation can all be performed within an isolated environment 112, before the code is released back to the central development environment.

For example, to ensure module integrity, characteristics of a given module (e.g., in the form of a container image) can be randomly selected and group into subsets. Flawed constructs can be detected as a subset separate from the normal sets, thereby providing an anomaly set containing container images having relatively high anomaly scores. Then anomaly score for a given module or container image can be determined based on the number of times it took to isolate the module or container image, with higher scores indicating more isolation and thus more deviation from the norm. A threshold score can be determined by supervising the process; based on the observation patterns, the threshold score can be fed to an isolation forest machine learning model so that it can perform the process unsupervised. The anomaly score can be calculated using the following equation:

$$A = 2^{\frac{-E(M)}{c(n)}}.$$

In the above equation, A represents the anomaly score, E(M) represents the average path length of a module M through a collection of isolation trees, and c (n) is a constant calculated to represent how long it typically takes to find something in a binary tree structure and normalize.

Example 4—Example Method Implementing Isolated Environments for ERP Modules

Figure 2:
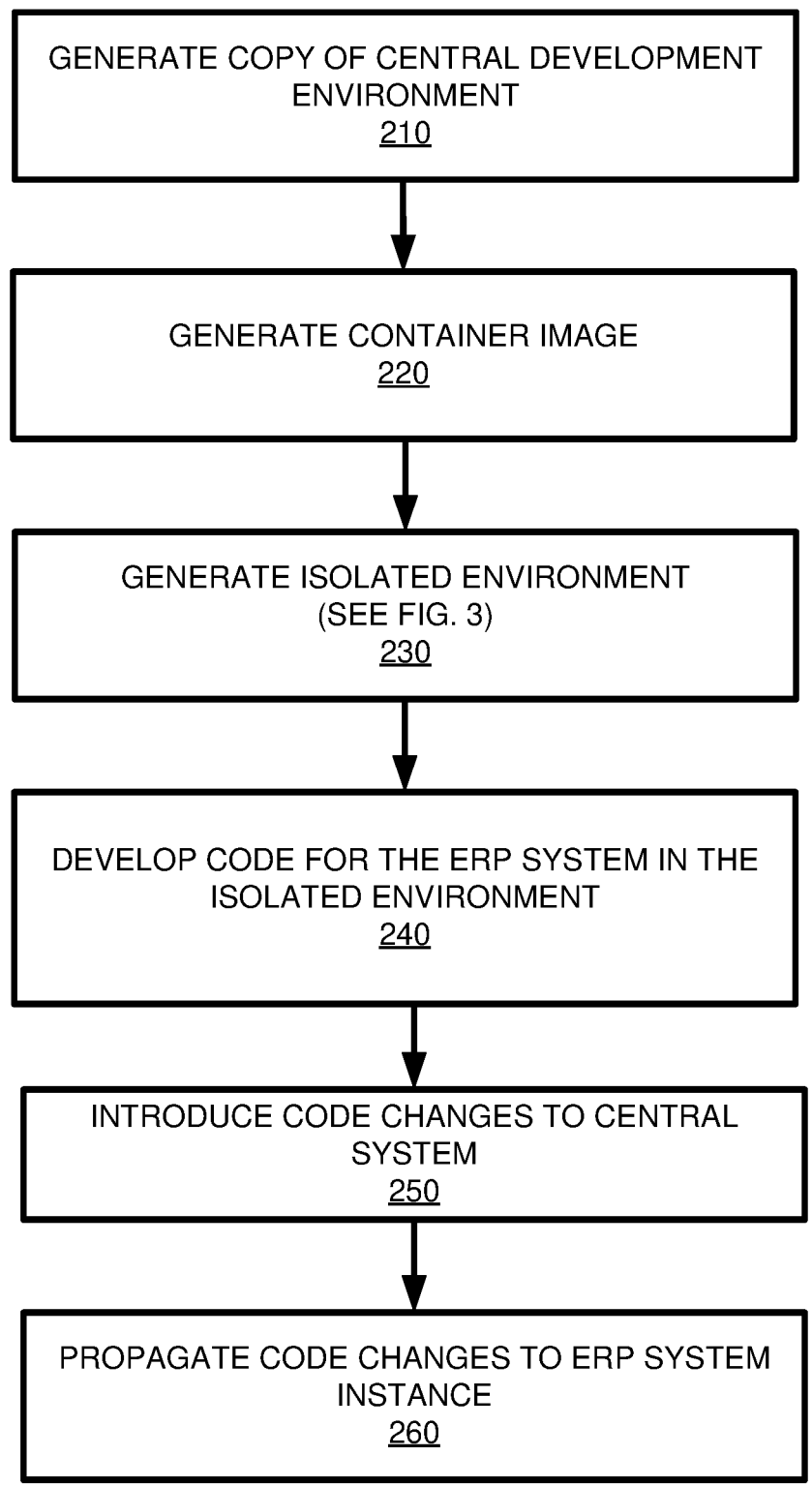
FIG. 2 is a flowchart of an example method of implementing isolated environments for ERP modules.

FIG. 2 is a flowchart of an example method 200 of implementing isolated environments for ERP modules and can be performed, for example, by the system of FIG. 1. While method 200 describes implementation of a single isolated environment for the sake of brevity, the method can also be used to implement multiple isolated environments.

In the example, at 210, a copy of the central development environment is generated. The copy can be generated via a backup process (e.g., a Unix backup process) at predetermined intervals (e.g., nightly or weekly).

At 220, a container image is generated from the copy of the central development environment generated at 210. Container image 110, which can alternatively be referred to as a Dockerfile, can include static data defining a container which represents central development environment 106 and its contents.

At 230, an isolated environment is generated. The isolated environment can be generated based at least in part on the container image generated at 220 and can encompass and correspond to some portion of the central development environment (e.g., a module of the central development environment, part of a module, or multiple modules). For example, container image 110, or a portion thereof, can be executed to generate an isolated environment. As discussed further below with reference to FIG. 3, a graph-based machine learning model can be applied to the container image to predict dependencies between the modules in the container image. The design of the isolated environment can account for the predicted module dependencies, among other factors. For example, the container image which is executed to generate the isolated environment can first be modified based on the predicted dependencies.

The generation of the isolated environment can also be influenced based on verification of module integrity, which can be performed using an isolation forest machine learning model. For example, depending on the results of the module integrity verification, the container image which is executed to generate the isolated environment can be modified.

For example, in the isolation forest model, each module can be represented as a feature vector $A=(A_1, A_2, \ldots, A_f)$, where f is the number of features or characteristics. Using the isolation forest model, isolated trees are created. Random feature selection and random split approaches are then used to achieve a partition. The partition can be verified using the data points based on their path lengths in isolation trees. These are based on patterns which resemble so-called "usualness."

At 240, code for the ERP system is developed in the isolated environment generated at 230. In some examples, each of a plurality of developers can be assigned a respective isolated environment in which they can develop a portion of code (e.g., code for a module or an object) for the ERP system. In other examples, multiple developers can share a single isolated environment. For example, a team of developers tasked with a given module can work within the same isolated environment to develop code for that module, using branching as needed.

At 250, code changes resulting from the development performed in the isolated environment are introduced to the central development environment. In some examples, the status of a given portion of code is considered before any changes to that portion of code are introduced to the central development environment. For example, code can be either (a) in development; (b) released but not delivered; or (c) released and delivered. Thus, at any point in time, a container image may contain code in different states. When a container image contains any code with status (a), it may be necessary to ensure that any changes to that code are identified and reverted to either state (b) or (c) prior to being introduced to the central development environment, to prevent inconsistencies.

At 260, the changes introduced to the central development environment at 250 are propagated to an instance of the ERP system. In some examples, the propagation of the changes to the ERP system instance occurs via a delivery landscape, such as delivery landscape 118 of FIG. 1.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, propagating changes to the ERP system instance can be described as receiving changes at the ERP system instance, depending on perspective.

Example 5—Example Method for Generating Isolated Environments

Figure 3:
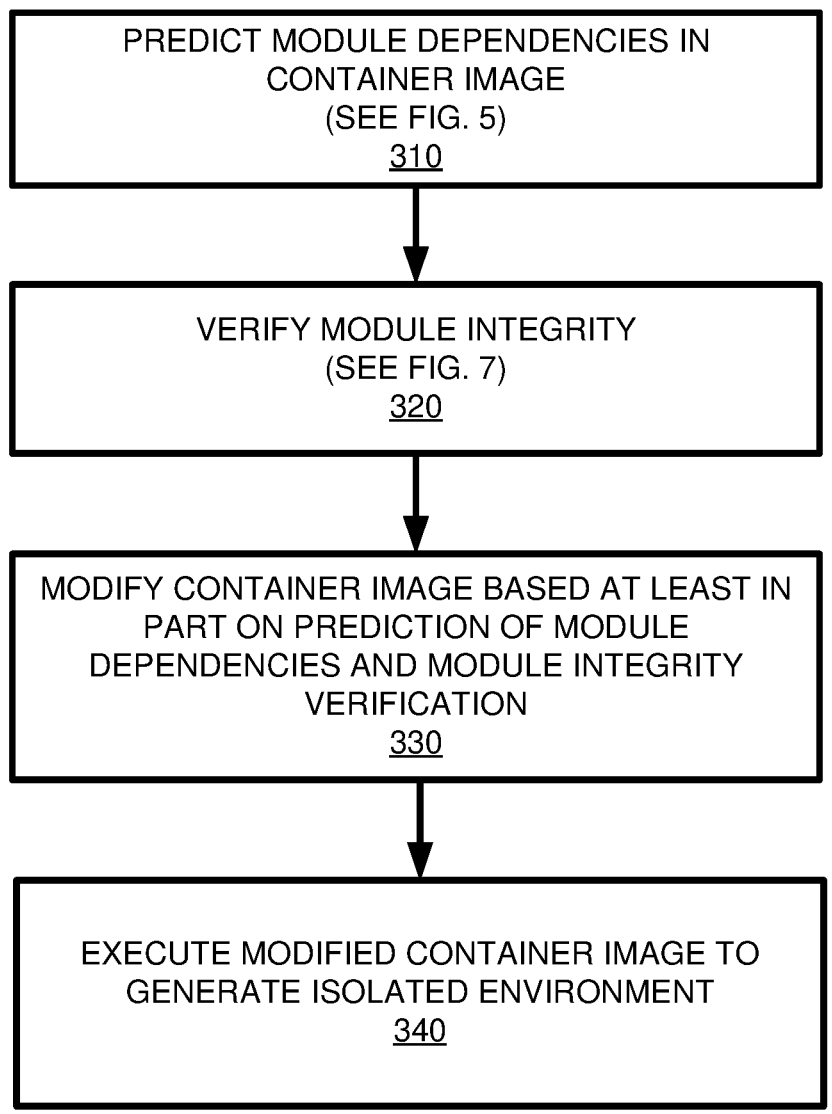
FIG. 3 is a flowchart of an example method of generating isolated environments for development of modules of an ERP system.

FIG. 3 is a flowchart of an example method 300 of generating an isolated environment for development of a portion of an ERP system and can be performed, for example, by the system of FIG. 1. Whereas method 300 describes generating an isolated environment for development of a single module of an ERP system, it is contemplated that isolated environments could also be generated for other portions of an ERP system (e.g., one isolated environment encompassing multiple modules, or one isolated environment corresponding to only part of a module). For example, a given module of an ERP system may be associated with multiple scenarios (e.g., business scenarios). In such an example, an isolated environment can be created for each scenario.

Figure 5:
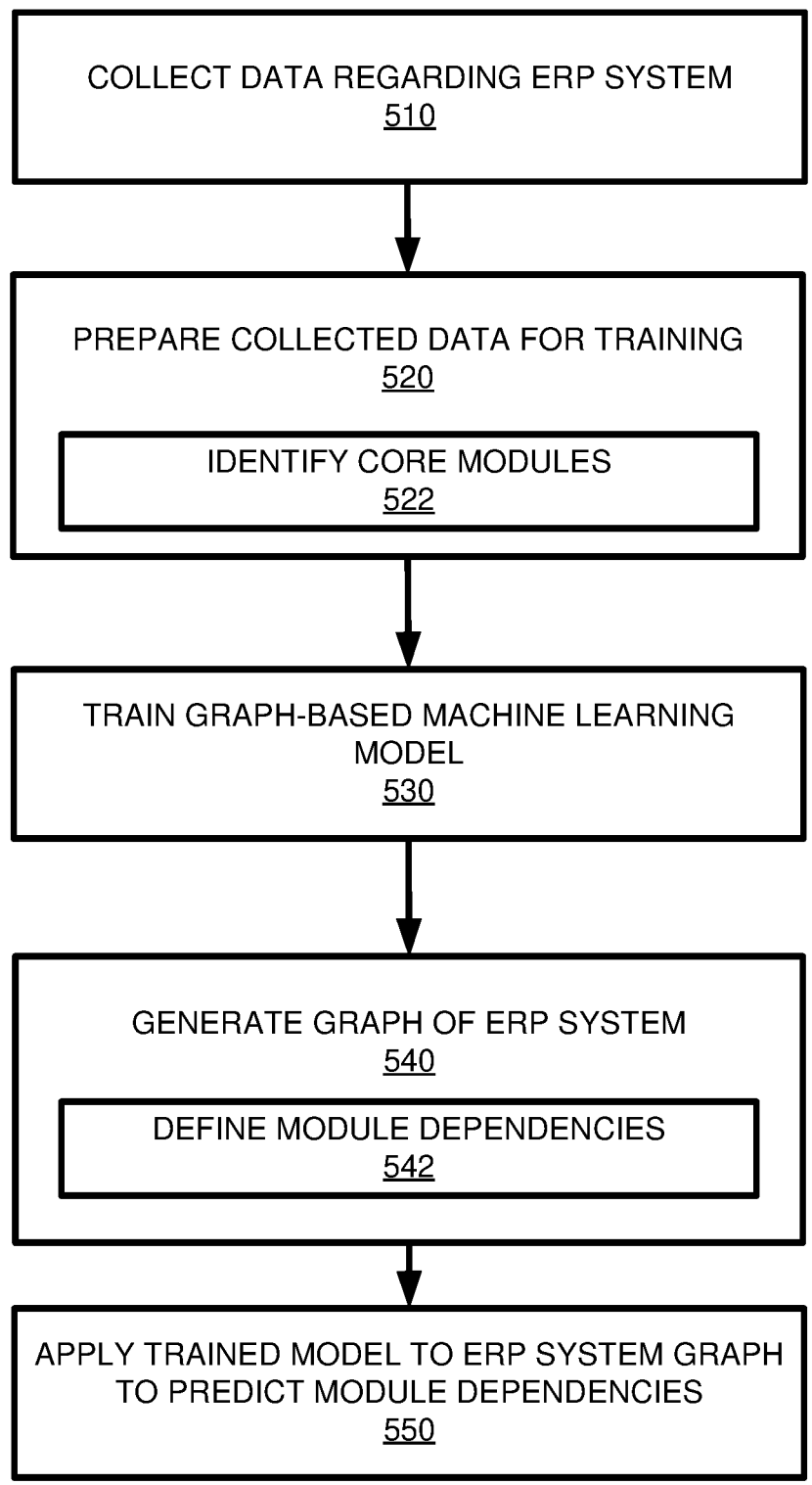
FIG. 5 is a flowchart of an example method of predicting dependencies between modules of an ERP system using a trained graph-based machine learning model.

In the example, at 310, module dependencies in a container image are predicted. The container image can represent a central development environment of a development framework. Dependencies between modules can refer to connections and/or relationships between the modules. The prediction of the module dependencies can be carried out using a graph-based machine learning model. An example method for predicting module dependencies in a container image is shown in FIG. 5. The prediction of module dependencies can involve analyzing module dependency relationships to determine which modules rely on others to function correctly, e.g., based on historical data and code analysis.

Figure 7:
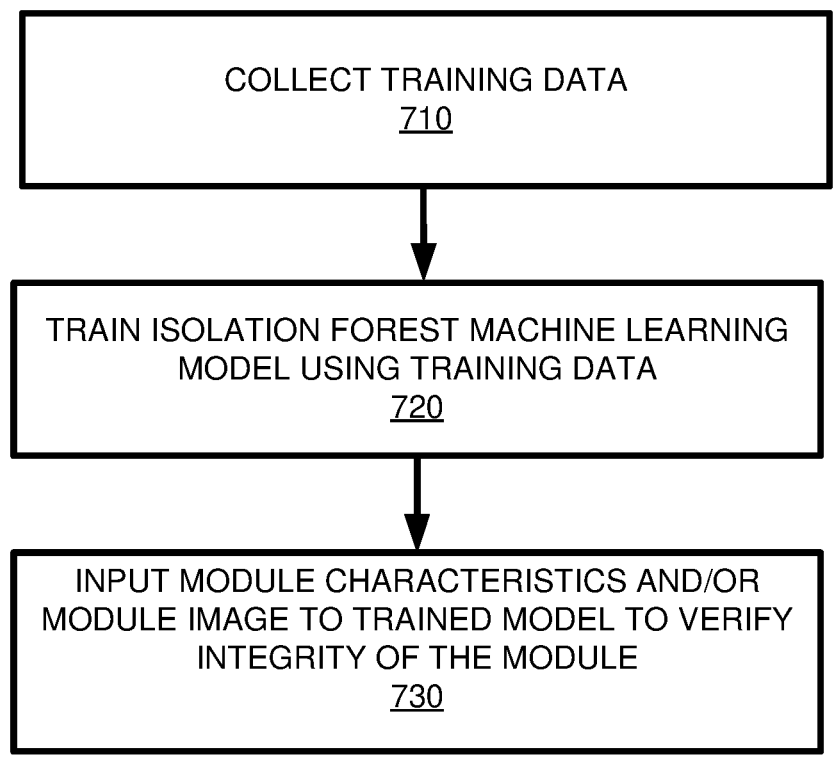
FIG. 7 is a flowchart of an example method for verifying the integrity of an ERP system module via a trained isolation forest machine learning model.

At 320, the integrity of one or more modules of the ERP system is verified. An example method for verifying module integrity which utilizes an isolation forest machine learning model to analyze module characteristics and/or module images is shown in FIG. 7. The module integrity verification process can include analyzing code to ensure there are no inconsistencies from in-development or partial code that may creep in during the backups of the central development environment. For example, all the code can be analyzed and vulnerability scanning and integration checks can be triggered to ensure compliance and avoid serious security issues.

At 330, the container image is modified based at least in part on the prediction of module dependencies and the module integrity verification. For example, any modules that are predicted to have problematic dependencies or that fail the module integrity verification can be excluded from the container image to prevent potential issues from affecting the isolated environment. In examples where the module integrity verification identifies anomalies or deviations in the structure of a module, the modification of the container image can address the identified issues. Similarly, in examples where the module integrity verification identifies anomalies during the image creation process for the module, the isolated environment can be modified at 330 to address the identified issues.

At 340, the modified container image is executed to generate an isolated environment. The isolated environment can be similar to a container, e.g., a computing environment which, during execution, at least partially isolates an application's view of an underlying operating system and/or resources.

While method 300 describes an example in which an isolated environment for an individual module is developed, similar methods can be performed to generate isolated environments with different scopes. For example, a method similar to method 300 can be performed to generate an on-demand integration test environment for an ERP system. As another example, in an ERP system, modules for inventory management, order processing, and shipping might be isolated together to simulate end-to-end processes. As yet another example, in the context of an on-demand development environment for an ERP system, the isolation can be limited to inventory management for the relevant teams. In particular, separate environments can be enabled for each business area or function. These separate environments can have the capability to network, e.g., if they are in a dedicated cluster.

Example 6—Example System for Predicting Dependencies Between Modules

Figure 4:
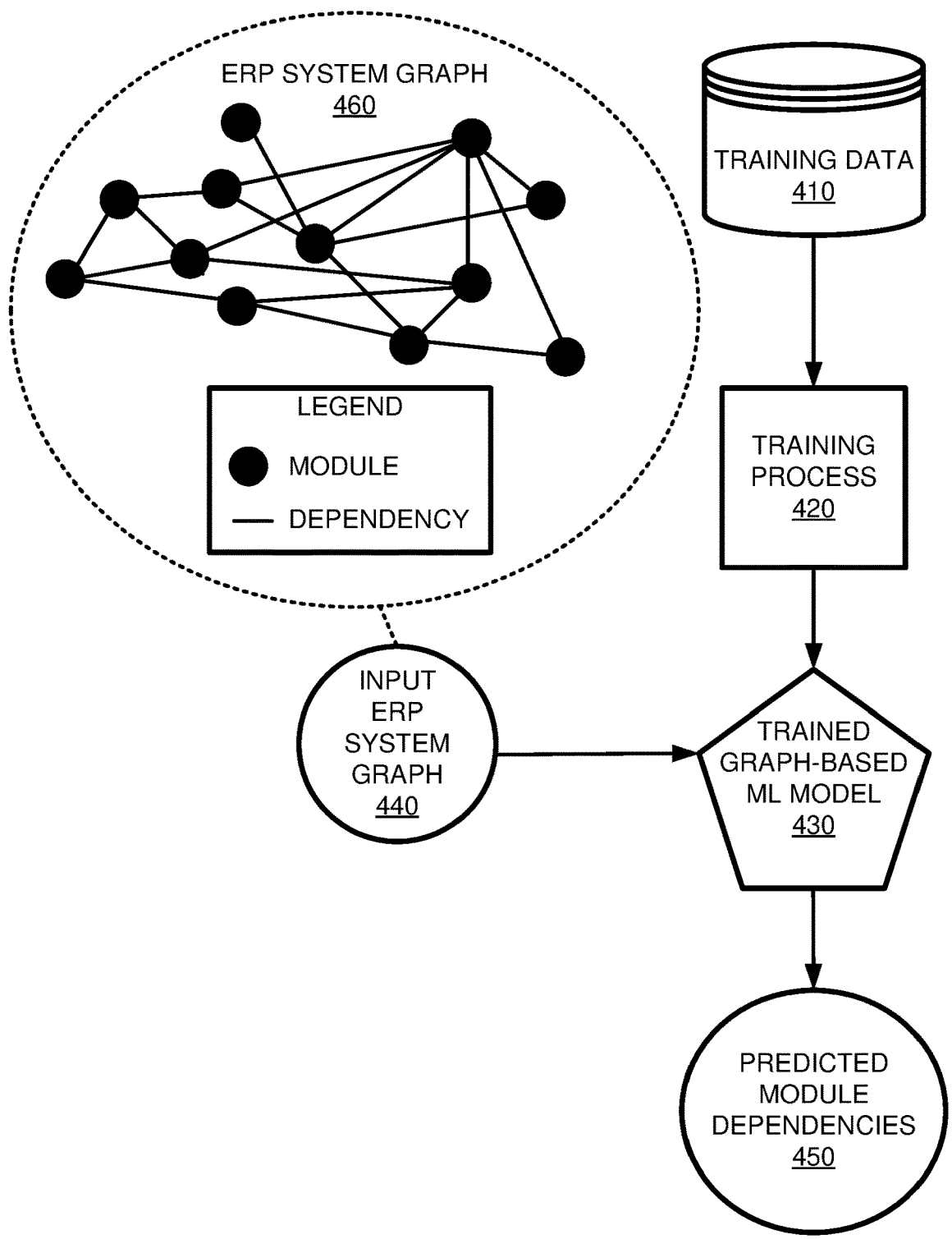
FIG. 4 is a block diagram of an example system for predicting dependencies between modules of an ERP system via a trained graph-based machine learning model.

FIG. 4 is a block diagram of an example system 400 for predicting dependencies between modules of an ERP system via a trained graph-based machine learning model. As described herein, the model can learn from the ERP system's graph structure, incorporating features and historical data to make informed predictions regarding the dependencies between the modules. In some examples, the graph-based machine learning model is a graph convolutional network (GCN) machine learning model.

Any of the systems herein, including the system 400, can comprise at least one hardware processor and at least one memory coupled to the at least one hardware processor.

In the example, the system 400 includes training data 410 for training the graph-based machine learning model. Training data 410 can include, for example, system documentation, database schema, integration points, and logs for the ERP system. As described herein, various pre-processing actions can be performed on training data, such as splitting the data into training and validation sets for model training and evaluation.

The training data is then used an input to a training process 420. In examples where the graph-based machine learning model is a GCN model, training process 420 can include defining the architecture of the GCN. The architecture of the GCN can include multiple graph convolutional layers followed by non-linear activation functions. Training process 420 can further include training the model using the prepared dataset and optimizing parameters using back-propagation and gradient descent techniques. Hyperparameters of the model, such as the number of layers, hidden units, learning rate, and regularization strength, can be tuned through cross-validation to ensure optimal performance and accurate predictions. During the training process, the model can learn to propagate information across the graph and capture the complex dependencies between modules, so as to accurately predict relationships between the modules.

Training process 420 produces a trained graph-based machine learning model 430, which accepts an input ERP system graph 440 and generates one or more predicted module dependencies 450. Graph-based machine learning model 430 can be a GCN machine learning model. A GCN machine learning model can be configured to leverage the inherent connectivity and relationships between modules in an ERP system, making this type of model ideal for capturing and analyzing module dependencies.

Alternatively, another type of graph-based machine learning model can be used. For example, a Graph Neural Network (GNN) such as Graph Sample and Aggregate (GraphSAGE) or Graph Attention Network (GAT) can be used to capture and model dependencies in graphs. The Variational Graph Autoencoder (VGAE) model can be used to capture uncertainty in the graph structure and introduce probabilistic modeling to improve the module integrity verification. Further, Graph Reinforcement Learning (GRL) can be used to optimize actions or configurations within an ERP system based on module relationships.

An example ERP system graph is depicted at 460. As indicated in the legend, the ERP system graph represents modules of the ERP system as nodes, and dependencies between modules of the ERP system are represented as edges. Additional features of the ERP system such as module interactions, integration points, and data entities can be encoded in the ERP system graph as node attributes or sub-nodes.

The predicted module dependencies generated by the model can be used during the generation of an isolated environment. For example, a container image of the ERP system can be modified based at least in part on the predicted module dependencies, prior to being executed to generate an isolated environment for a portion (e.g., module) of the ERP system. This can include tailoring the configuration of the container image used to generate the isolated environment to accurately reflect the predicted module dependencies. Towards this end, configuration files can be adjusted to specify which modules need to interact with each other, and environment variables can be set to define communication endpoints or data sources that the modules depend on. Modules predicted to have strong dependencies with the target module can be selectively included in the container image, to ensure that the isolated environment includes the necessary components for accurate testing or development.

Further, the predicted module dependencies can guide the testing and validation processes within the isolated environment. Test scenarios and cases can be designed to specifically evaluate the interactions between modules based on these dependencies. Modules with strong dependencies can receive higher resource allocations to ensure smooth interactions, while independent modules can operate with fewer resources. This approach enhances the effectiveness of testing, development, and validation processes, e.g., by aligning these processes with the dependencies and integrations that are required to isolate each module of the ERP system.

The system 400 can also comprise one or more non-transitory computer-readable media having stored therein computer-executable instructions that, when executed by the computing system, cause the computing system to perform any of the methods described herein.

In practice, the systems shown herein, such as system 400, can vary in complexity, with additional functionality, more complex components, and the like. For example, the training data 410 can include significantly more training data and test data so that predictions can be validated. There can be additional functionality within the training process. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 400 and any of the other systems described herein can be implemented in conjunction with any of the hardware components described herein, such as the computing systems described below (e.g., processing units, memory, and the like). In any of the examples herein, the training data 410, trained model 460, and the like can be stored in one or more computer-readable storage media or computer-readable storage devices. The technologies described herein can be generic to the specifics of operating systems or hardware and can be applied in any variety of environments to take advantage of the described features.

Example 7—Example Method for Predicting Dependencies Between Modules

FIG. 5 is a flowchart of an example method 500 for predicting dependencies between modules of an ERP system and can be performed, for example, by the system of FIG. 1.

In the example, at 510, data is collected regarding the ERP system. Collecting the data can include gathering the data from various sources, including ERP system documentation, database schema, integration points, and logs.

At 520, the collected data is prepared for training. At this stage, the collected data can be pre-processed, e.g., by cleaning duplicates, handling missing values, and transforming the data into a suitable format for graph-based algorithms. Preparation of the data for training can further include splitting the data into training and validation sets for model training and evaluation.

In the example, preparing the collected data for training can also include identifying core modules at 522. One approach for identifying core modules, described in further detail below, uses degree centrality as the metric.

At 530, a graph-based machine learning model, such as a GCN machine learning model, is trained using the prepared data. The training can include defining the architecture of the GCN, which can include multiple graph convolutional layers followed by non-linear activation functions, and optimizing the parameters of the model using backpropagation and gradient descent techniques. Further, hyperparameters of the model such as the number of layers, hidden units, learning rate, and regularization can be tuned through cross-validation.

At 540, a graph of the ERP system is generated. Generating a graph of the ERP system can include representing the ERP system as a graph, with modules as nodes and dependencies as edges. Additional features of the ERP system such as module interactions, integration points, and data entities can be encoded in the graph as node attributes.

Generating the graph of the ERP system can include defining module dependencies at 542. An example approach for defining module dependencies is described in further detail below.

At 550, the trained model is applied to the ERP system graph to predict module dependencies. In particular, the model can learn to propagate information across the graph, capturing the complex dependencies between modules and accurately predicting their relationships.

Example 8—Example Approach for Identifying Core Modules

In the context of method 500, during preparation of the collected data for training, core modules can be identified using various approaches. In one example approach, degree centrality is used to measure how connected a module is to other modules in terms of dependencies. In this approach, G(M,D) represents a dependency graph, in which M represents a set of modules and D represents a set of directed edges representing dependencies. A function C(m) that calculates the degree centrality of a module m can be defined as the sum of the number of incoming dependencies to m and the number of outgoing dependencies from m. Next, a threshold T for degree centrality to identify core modules can be set as a predefined value above which a module is considered a core module. Core modules can then be determined using the following mathematical expression:

$$CoreModules = \{m \mid C(m) \geq T, \text{ for all } m \text{ in } M\}.$$

It will be appreciated that determining the threshold involves a supervised learning approach, as it involves developers to confirm and test the completeness of the isolated module. Once the thresholds are confirmed through supervised learning, a similar algorithm can be used to decide whether a module is a core module. In particular, another function C'(m) can be defined that calculates the degree of centrality of module M which has an inward dependency (e.g., more inward references than outgoing references). The function C'(m) can be referred to as the in-degree centrality of the module m. Then, iterating through the modules in the set M, the in-degree centrality C'(m) is calculated. If C'(m) is greater than or equal to the threshold T for a given module, that module is added to the list of core modules.

Example 9—Examples Approach for Defining Module Dependencies

In the context of method 500, during generation of the graph of the ERP system, module dependencies can be defined using various approaches. In one example approach, an empty graph data structure is created to represent the dependencies between modules. An adjacency list or matrix can be used. Towards this end, a node in the dependency graph is created to represent each module m in the set M of modules. For each module m in M, graphs indicating where the module is used are defined, and sub-module graphs are incorporated to represent the module.

Subsequently, an analysis structure and configuration entries for the current dependency graph can be created, e.g., by executing the following code:

```
function performDependencyAnalysis(modules, dependencyInfo):
    dependencyGraph=createEmptyGraph( )
    for m in M:
        dependencyGraph.addNode(m)
    for m in M:
        for dependency in D[m]:
            dependencyGraph.addEdge(m, D)
    return dependencyGraph
```

In order to resolve a dependency circular reference problem, the following code can be executed:

```
def dependency_resolve(m, resolved, unresolved):
    unresolved.append(m)
    for d in m.d:
        if d not in resolved:
            if d in unresolved:
                raise Exception((m.name, d.name))
            dependency_resolve(d, resolved, unresolved)
    resolved.append(m)
    unresolved.remove(m)
```

After the dependencies between the core modules have been defined, the core modules can be containerized, as described further herein. Containers can also be created for non-core modules, such as platform-specific and runtime-specific modules. Subsequently, the containerized modules can be deployed and orchestrated. In some examples, a self-aware mechanism can be used to adjust the core modules in case of new dependencies that may arise, e.g., due to new ERP system requirements.

Example 10—Examples of Additional Applications for Graph-Based Machine Learning Model In addition to predicting module dependencies in an ERP system as described herein, a graph-based machine learning model such as a GCN model can be used to optimize development of ERP system modules in other ways.

As one example, conflict resolution can be performed using a graph-based machine learning model. In particular, the model can utilize historical conflict data along with the predicted module dependencies to suggest resolutions to conflicts.

As another example, a graph-based machine learning model can be used to develop a rule-based system that incorporates expert knowledge and historical success rates to recommend compatible module versions, configuration adjustments, or alternative integration approaches.

Further, a collaboration and feedback loop can be established which incorporates the output of a graph-based machine learning model. In particular, collaboration between teams responsible for dependent modules can be facilitated by sharing the results of module dependency analysis and conflict resolution suggestions. A feedback loop to gather user insights and feedback on the suggested resolutions can be established, thereby enabling continuous improvement of the model and conflict resolution mechanisms.

The recommended resolutions can be implemented incrementally, considering the criticality and complexity of each dependency. The system's performance can be monitored and feedback can be collected during the resolution implementation phase. Accordingly, the model and the conflict resolution mechanisms can be refined continuously based on real-world usage, user feedback, and evolving conflict scenarios.

Example 11—Example System for Verifying Module Integrity

Figure 6:
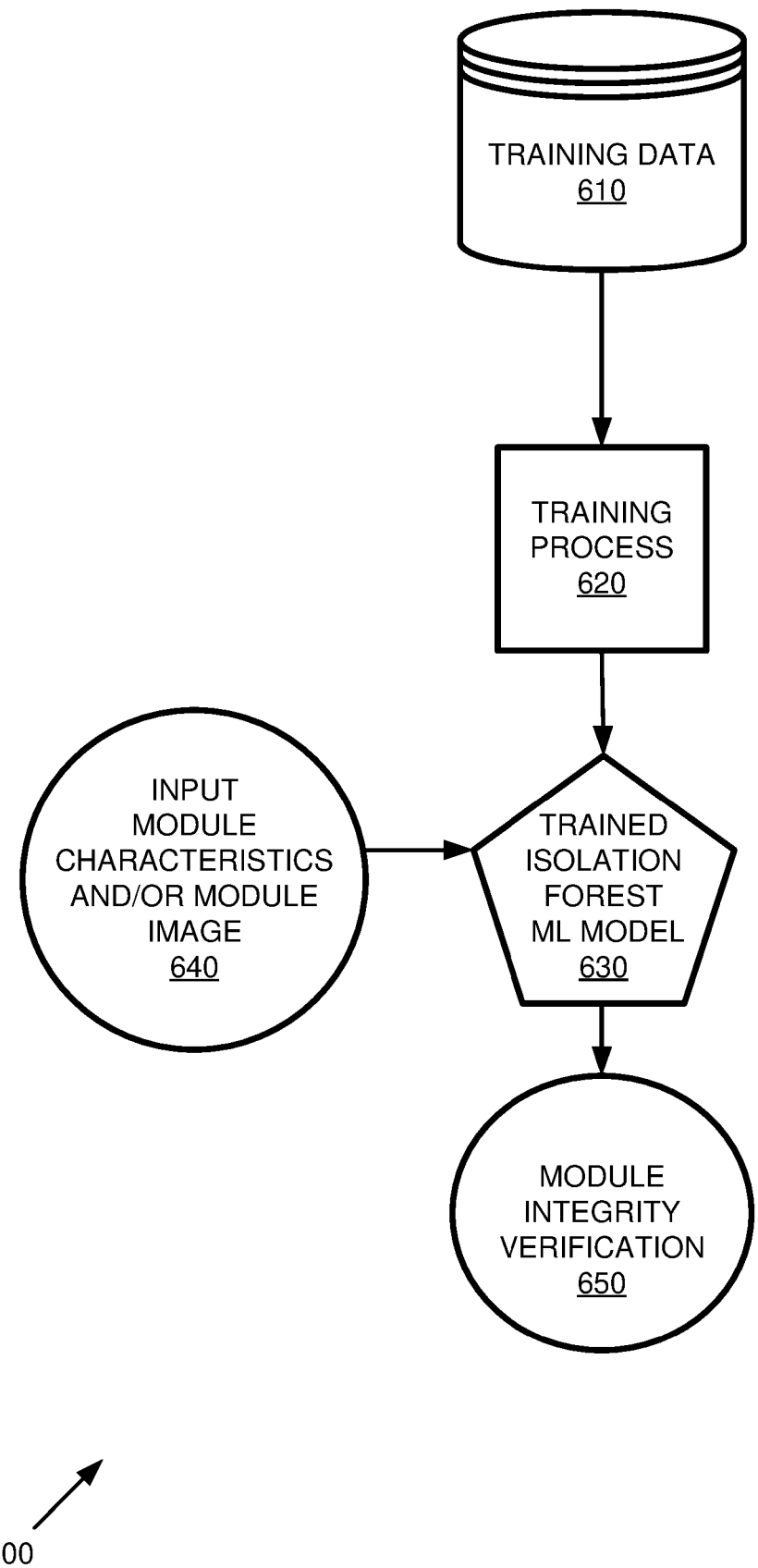
FIG. 6 is a block diagram of an example system for verifying the integrity of an ERP system module via a trained isolation forest machine learning model.

FIG. 6 is a block diagram of an example system 600 for verifying the integrity of a module of an ERP system via a trained isolation forest machine learning model. The isolation forest model can autonomously identify anomalies and deviations in module characteristics, configurations, and behaviors.

In the example, the system 600 can include training data 610 for training the isolation forest machine learning model. Training data 610 can include data regarding the characteristics of a module of the ERP system, such as the module's dependencies, configurations, and interactions with other modules, along with historical data regarding the module's behavior. Additionally or alternatively, training data 610 can include a dataset of images of "good" example modules which includes software libraries, packages, and configurations for modules whose integrity has already been verified.

Training data 610 can also optionally include one network traffic patterns and module behavior within the ERP system, user access patterns, historical user authentication data, data access patterns, module interactions, module resource utilization patterns, overall system performance data, historical failure data and module restart policies, real-time monitoring and logging data from the module, past testing and validation data, and/or historical maintenance data including patching and update records for the module.

The training data 610 is used as input to a training process 620. Training process 620 produces a trained isolation forest machine learning model 630, which accepts an input module characteristics and/or a module image 640 and generates a verification of module integrity 650 as an output. Towards this end, parameters of the isolation forest model, such as the number of trees in the forest and the contamination threshold, can be fine-tuned to achieve optimal anomaly detection performance. The model can continuously learn from historical data, adapt to evolving patterns, and provide real-time feedback on module integrity.

As discussed herein, depending on the results of the module integrity verification, a container image that is executed to generate an isolated environment for development of the module can be modified.

Example 12—Example Method of Verifying Module Integrity

FIG. 7 is a flowchart of an example method 700 of verifying the integrity of an ERP system module using a trained isolation forest machine learning model. Method 700 can be performed, for example, by the system of FIG. 1.

In the example, at 710, training data is collected. The collected training data can include data regarding characteristics, configurations, and behaviors of the module and image data for example modules, among other data.

The prepared data is then used to train an isolation forest machine learning model at 720. In the training process, the model can learn from historical data and patterns associated with the module in order to be able to identify anomalies or deviations in the structure of the module. This in turn can facilitate proper isolation and containerization of the module during generation of an isolated environment for the module. Additionally or alternatively, the training process can include analyzing the composition of module images with the model, including software libraries, packages, and configurations of the associated modules. By learning from a dataset of known "good" module images, the model can detect anomalies during the image creation process for the module (e.g., during generation of the isolated environment for the module), thereby ensuring the integrity of the module.

At 730, characteristics and/or an image of a selected module are input to the trained isolation forest model to verify the integrity of the selected module. For example, after receiving the characteristics of the selected module and/or the image of the selected module, the isolation forest model can be run using these inputs to generate a verification of the integrity of the selected module as an output.

Example 13—Examples of Additional Applications for Isolation Forest Machine Learning Model In addition to verifying module integrity as described herein, an isolation forest machine learning model can be used to optimize development of ERP system modules in other ways.

For example, the isolation forest machine learning model can be used to verify proper network segmentation in the ERP system. Towards this end, the ML model can learn the network traffic patterns and behaviors of each module within the ERP system. By monitoring network data and learning from historical patterns, the model can identify abnormal network activities that may indicate unauthorized access or improper segmentation.

As another example, the isolation forest machine learning model can assist with access control and authentication in the ERP system. In particular, the model can analyze user access patterns and historical authentication data. By learning from user behavior, the model can detect anomalies or suspicious access attempts, thereby helping to enforce access control and authentication mechanisms effectively.

The isolation forest machine learning model can also assist with data isolation in the ERP system. For example, the model can learn the data access patterns and interactions of each module. By analyzing historical data access logs and user behavior, the model can identify deviations from normal data access patterns, alerting for potential data leakage or unauthorized access.

In addition, the isolation forest machine learning model can assist with performance configuration for the ERP system. Towards this end, the model can analyze the resource utilization patterns of each module and the overall system performance. By learning from historical performance data, the model can identify anomalies or resource bottlenecks, enabling optimal resource allocation and performance configuration.

As another example, the isolation forest machine learning model can facilitate fail-safe configuration for the ERP system. In particular, the ML model can analyze historical failure data and module restart policies. By learning from past failures and system behavior, the model can provide insights on appropriate restart policies and replica counts to ensure fail-safe operation.

Further, the isolation forest machine learning model can assist with monitoring and logging in the ERP system. For example, the ML model can analyze real-time monitoring and logging data from each module. By learning from historical logs and patterns, the model can identify anomalies or unusual events, enabling proactive monitoring and issue detection.

As another example, the isolation forest machine learning model can facilitate testing and validation of the ERP system. Towards this end, the ML model can learn from past testing and validation data, including test results and known issues. By analyzing the historical dataset, the model can provide feedback on potential areas of improvement and automatically suggest changes to enhance module integrity.

As yet another example, the isolation forest machine learning model can assist with regular maintenance and updates of the ERP system. In particular, the model can learn from historical maintenance data, including patching and update records. By analyzing historical maintenance patterns, the model can provide recommendations on regular maintenance schedules, ensuring timely updates and preserving module integrity.

Example 14—Example System for Recommending Modernization

Figure 8:
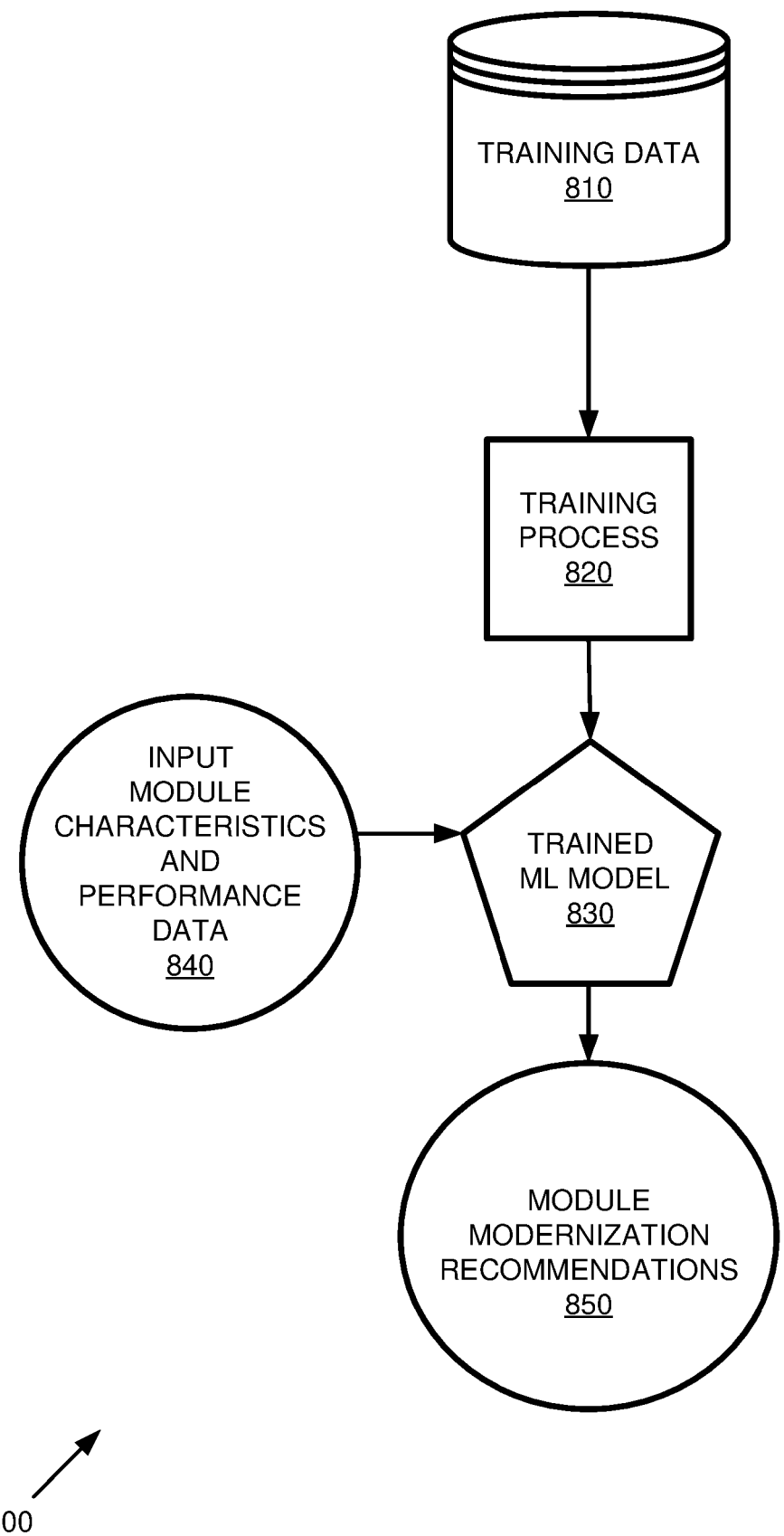
FIG. 8 is a block diagram of an example system for generating modernization recommendations for an ERP system via a trained machine learning model.

FIG. 8 is a block diagram of an example system 800 for recommending modernization of an ERP system. As used herein, the term "modernization" refers to rewriting, re-architecting, or porting software (e.g., modules or other portions of an ERP system) from a legacy architecture or programming language to a modern architecture or programming language. Rewriting software can include rebuilding the software using modern tools and methods while preserving its core functions. Re-architecting software can include restructuring the software to make it more efficient and adaptable, often by dividing it into smaller, more manageable parts. Porting software can include relocating the software from an outdated environment to a modern one for improved performance and compatibility.

Numerous advantages can be achieved via modernization of modules of a software system, such as an ERP system. For example, modernization can enhance efficiency in creating isolated environments. Further, the improved compatibility between modules achieved via modernization can reduce verification issues; modernization can enable a better graphical view of dependencies, and each dependency will already be test isolated to facilitate creation and verification of the corresponding container image. Modernization also improves resource efficiency, thereby streamlining development and testing. In addition, modernization provides enhanced security and compliance which in turn improves reliability. Moreover, modernized modules can be seamlessly integrated within isolated environments.

In the example, the system 800 can include training data 810 for training a machine learning model. Training data 810 can include historical data, performance metrics, user interaction patterns, and configuration parameters. As discussed below, the training data can be obtained via exploratory data analysis and feature extraction processes.

The training data 810 is used as input to a training process 820. Training process 820 produces a trained machine learning model 830, which accepts input module characteristics and performance data 840 and generates a modernization recommendation 850.

Different types of machine learning models can be selected as machine learning model 830, such as a decision tree machine learning model or a random forest machine learning model.

When a decision tree model is selected, example parameters for the model can include a maximum depth parameter, a splitting criterion parameter, and a minimum sample split parameter. The maximum depth parameter can determine the maximum depth of the decision tree, controlling the complexity and overfitting. It can be tuned to find the right balance between model complexity and generalization. The splitting criterion parameter can define the metric used to evaluate the quality of a split, such as a Gini impurity or information gain. The minimum sample split parameter can specify the minimum number of samples required to split an internal node, influencing the growth of the tree and preventing overfitting.

When a random forest model is selected, example parameters for the model can include a number of estimators parameter, a maximum features parameter, and a maximum depth parameter. The number of estimators parameter can set the number of decision trees to be trained in the random forest ensemble. A higher number for this parameter can improve model performance, but may increase training time. The maximum features parameter determines the number of features to consider when looking for the best split at each node. This parameter can thus control the diversity and randomness within the ensemble. The maximum depth parameter sets the maximum depth of each decision tree within the random forest, thereby constraining the model's complexity and overfitting.

In some examples, multiple machine learning models are trained (e.g., a decision tree model and a random forest model) for use in generating modernization recommendations for modules of an ERP system. The initial performance of the models can be evaluated and compared using appropriate metrics, such as accuracy, precision, recall, or mean squared error. The results can be compared to determine the baseline performance of each model. Fine-tuning can then be performed on both models. For example, hyperparameter optimization techniques, such as grid search or random search, can be performed to find the optimal values for the model parameters. Different combinations of parameter values can be iterated over, and the models' performance can be evaluated on a validation dataset. After the fine-tuning, the model configuration that yields the best performance can be selected, considering factors such as overall accuracy, robustness, and interpretability.

The selected fine-tuned model can then be used to generate modernization recommendations based on the input module characteristics and performance data. The fine-tuning process can ensure that the models are optimized to provide accurate and reliable recommendations. Subsequently, feedback can be gathered on the recommended modernization strategies output by the models, and the models can be iterated on if necessary. New data can be incorporated and the models can be periodically retrained to ensure they remain up-to-date and relevant.

Example 15—Example Method of Recommending Modernization

Figure 9:
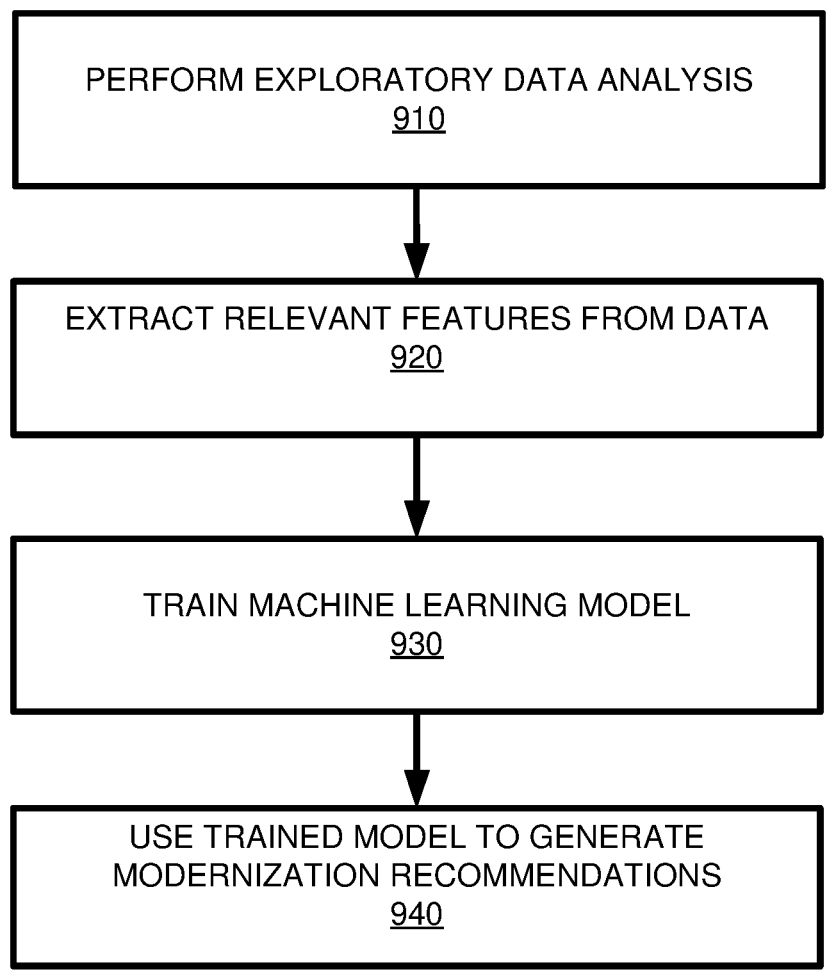
FIG. 9 is a flowchart of an example method for generating modernization recommendations for an ERP system via a trained machine learning model.

FIG. 9 is a flowchart of an example method 900 of generating modernization recommendations for an ERP system. Method 900 can be performed, for example, by the system of FIG. 1.

In the example, at 910, exploratory data analysis is performed to gain insights into the performance, usage, and user feedback for a given module of the ERP system.

At 920, relevant features are extracted from the data regarding the module, such as performance metrics, user interaction patterns, or configuration parameters.

The extracted data is then used to train a machine learning model at 930. In some examples, the machine learning model is a decision tree model or a random forest model. In either case, the data used to train the model can be historical data and relevant features for the selected module. When a decision tree model is used, the training can include setting initial parameters such as maximum depth, splitting criterion, and minimum sample split. When a random forest model is used, the training can include setting initial parameters such as the number of estimators, maximum features, and maximum depth.

At 940, the trained machine learning model is used to generate modernization recommendations for the selected module. In particular, characteristics and performance data for the selected module are input to the trained machine learning model, and one or more modernization recommendations for the module are output by the model.

For example, the trained machine learning model may recommend enhancing the test class hierarchy for a particular data model. This can include suggesting the transition of classes and methods to a different structure, e.g., segregating classes that handle specific calculations or tasks. The model can also help with location of isolated unit tests in a local test class, including in the productive class. Further, the model can help with detection of unknown differences in dependencies that might occur in different releases, e.g., a missed lower version of code in reused code owned by another team. For Application Programming Interfaces (APIs), the model may be able to verify complex data and deep structures in Extensible Markup Language (XML).

As one example, as a proposal for modernization, the trained machine learning model can use a TEST_SEAM statement to inject a desired sy-subrc value (e.g., return code) after an AUTHORITY-CHECK statement. Example product code and test code for this example in the Advanced Business Application Programming (ABAP) language are provided in Table 1 below.

TABLE 1

Example Modernization Proposal

| Product Code | Test Code |
|---|---|
| AUTHORITY-CHECK OBJECT 'S_ANY' ID 'SABC' FIELD 'TABL'. | TEST-INJECTION manipulate_authority. sy-subrc = 0. END-TEST-INJECTION.] |
| TEST-SEAM manipulate_authority. END-TEST-SEAM. | |
| IF sy-subrc <> 0. " react on negative authority check result ENDIF. | |

Example 16—Example Machine Learning Model

In any of the examples herein, a machine learning model can be used to generate predictions based on training data. The model can be used to check whether the new data point is an outlier. Such models are stored in computer-readable media and are executable with input data to generate an automated prediction.

While specific types of machine learning models are described herein, in practice, any number of models can be used. Examples of acceptable alternative models include one-class classifier, clustering technique, random decision tree, decision tree (e.g., binary decision tree), random decision forest, Apriori, association rule mining models, and the like.

Example 17—Example Training Process

In any of the examples herein, training can proceed using a training process that trains the model using available training data. In practice, some of the data can be withheld as test data to be used during model validation.

Such a process typically involves feature selection and iterative application of the training data to a training process particular to the machine learning model. After training, the model can be validated with test data. An overall confidence score for the model can indicate how well the model is performing (e.g., whether it is generalizing well).

In practice, machine learning tasks and processes can be provided by machine learning functionality included in a platform in which the system operates. For example, in a database context, training data can be provided as input, and the embedded machine learning functionality can handle details regarding training.

Example 18—Example Integration into ERP Software

In any of the examples herein, the technologies can be integrated into enterprise resource planning ("ERP") software. For example, the technologies can be integrated into SAP S/4HANA or SAP S/4HANA Cloud, public edition, both available from SAP SE of Walldorf, Germany.

Example 19—Use Cases

The technologies described herein can be applied in a variety of scenarios.

For example, software developers working on creating or updating a system, such as an ERP system, can use the technologies described herein to facilitate and expedite software development of the system. In particular, a first developer may be tasked with developing a package for a first scenario related to a FIN module (e.g., Scenario A). At the same time, a second developer may be tasked with developing a package for a scenario related to an EEPM module (e.g., Scenario B). In existing techniques, if the FIN module and EPPM module include a common object and the first developer is working on the common object, the second developer will have to wait until the first developer has released the common object from their transport before being able to work on the common object. In contrast, the technologies described herein enable the first and second developers to work in separate, isolated environments which include copies of relevant portions of the central development environment.

Example 20—Example Implementations

Any of the following can be implemented.

Clause 1. A computer-implemented method comprising: obtaining a copy of a central development environment for a software system; creating a container image of the central development environment based at least in part on the copy; predicting dependencies between modules of the software system; verifying integrity of one or more of the modules of the software system; modifying the container image based at least in part on the predicted dependencies and the integrity verification; and generating an isolated development environment for development of a portion of the software system, wherein the generating comprises executing the modified container image.

Clause 2. The method of Clause 1, wherein the prediction of the dependencies between the modules of the software system is performed using a first machine learning model, and wherein the verification of the integrity of the one or more modules of the software system is performed using a second machine learning model.

Clause 3. The method of Clause 2, wherein the first machine learning model is a graph convolutional network (GCN) model, and wherein predicting the dependencies between the modules of the software system using the GCN model comprises: collecting data regarding the software system; preparing the collected data for training; training the GCN model using the collected data; generating a graph of the software system; and applying the trained GCN model to the graph of the software system to predict the dependencies between the modules of the software system.

Clause 4. The method of Clause 3, wherein the graph of the software system comprises a plurality of nodes and a plurality of edges, wherein the nodes represent the modules of the software system and the edges represent dependencies between the modules of the software system.

Clause 5. The method of any one of Clauses 2-4, wherein the second machine learning model is an isolation forest model, and wherein verifying the integrity of the one or more modules of the software system comprises: collecting training data; training the isolation forest model using the training data; and inputting characteristics of a selected module to the trained isolation forest model to verify the integrity of the selected module.

Clause 6. The method of Clause 5, wherein the training data comprises a dataset of example module images, wherein training the isolation forest model using the training data comprises analyzing a composition of the example module images with the isolation forest model, and wherein verifying the integrity of the selected module further comprises inputting a module image of the selected module to the trained isolation forest model.

Clause 7. The method of any one of Clauses 2-6, further comprising generating a modernization recommendation using a third machine learning model, wherein the modification of the container image is further based on the modernization recommendation.

Clause 8. The method of any one of Clauses 1-7, further comprising: generating additional isolated development environments for development of the portion of the software system; and managing versions of repositories and objects associated with the isolated development environments using an external code repository.

Clause 9. The method of Clause 8, further comprising: with the external code repository, creating a plurality of branches within one or more of the isolated development environments.

Clause 10. The method of any one of Clauses 8-9, further comprising: registering the repositories and objects associated with the isolated development environments using a transport system.

Clause 11. A computing system, comprising: at least one hardware processor; at least one memory coupled to the at least one hardware processor; a central development environment for a software system, the software system comprising a plurality of modules; and one or more non-transitory computer-readable media having stored therein computer-executable instructions that, when executed by the computing system, cause the computing system to perform: obtaining a copy of the central development environment; creating a container image based at least in part on the copy; predicting dependencies between the modules of the software system; performing integrity verification for one or more modules of the software system; modifying the container image based at least in part on the predicted dependencies and the integrity verification; and executing the modified container image to generate one or more isolated development environments.

Clause 12. The system of Clause 11, wherein each isolated development environment is associated with a repository and one or more objects.

Clause 13. The system of Clause 12, further comprising: an external code repository configured to manage versions of the repositories and objects associated with the one or more isolated development environments; and a transport system configured to register the repositories and objects associated with the one or more isolated development environments.

Clause 14. The system of Clause 13, wherein: the external code repository is further configured to create a plurality of branches within the one or more isolated development environments.

Clause 15. The system of any one of Clauses 11-14, further comprising: a first machine learning model trained with data regarding the software system; and a second machine learning model trained with data regarding characteristics of a selected module of the software system.

Clause 16. The system of Clause 15, wherein: the predicting of the dependencies between the modules of the software system is performed using the first machine learning model; and the performing of the integrity verification for the one or more modules of the software system is performed using the second machine learning model.

Clause 17. The system of Clause 16, wherein: the first machine learning model is a graph convolutional network (GCN) model; and the predicting of the dependencies between the modules of the software system using the GCN model comprises applying the GCN model to a graph of the software system comprising a plurality of nodes and a plurality of edges, the nodes representing the modules of the software system and the edges representing dependencies between the modules of the software system.

Clause 18. The system of any one of Clauses 16-17, wherein: the second machine learning model is an isolation forest model; and the performing of the integrity verification for the one or more modules of the software system comprises inputting characteristics of a selected module and/or a module image of the selected module to the isolation forest model.

Clause 19. The system of any one of Clauses 11-18, further comprising generating a modernization recommendation using a third machine learning model, wherein the modification of the container image is further based on the modernization recommendation.

Clause 20. One or more non-transitory computer-readable media comprising computer-executable instructions that, when executed by a computing system, cause the computing system to perform operations comprising: obtaining a copy of a central development environment for a software system; creating a container image of the central development environment based at least in part on the copy; predicting dependencies between modules of the software system by applying a graph convolutional network machine learning model to a graph of the software system; verifying integrity of a selected module of the software system using an isolation forest machine learning model; modifying the container image based at least in part on the predicted dependencies and the integrity verification; and generating an isolated development environment for the selected module, wherein the generating comprises executing the modified container image.

Example 21—Example Advantages

A number of advantages can be achieved via the technologies described herein. For example, the provisioning process is automated, simplifying and standardizing the setup of isolated environments for ERP modules. These automation capabilities enable quick provisioning, scalability, and agility. By automating the processes, organizations can save time, reduce errors, and accelerate deployment of ERP modules.

Further, such technologies optimize resource allocation based on performance criteria, ensuring efficient utilization of CPU and memory resources. Security measures are enhanced through access control mechanisms and network segmentation, reducing the risk of unauthorized access and data breaches. Data isolation techniques, along with encryption and anonymization, are implemented to adhere to GDPR compliance requirements.

The technologies described herein also incorporate secure data erasure mechanisms and auditing features to ensure responsible handling of personal data.

Machine learning capabilities are utilized in the technologies described herein to analyze past provisioning data and optimize resource allocation, providing intelligent recommendations for extending the system based on historical patterns and performance metrics. This allows organizations to extend the solution on the fly within isolated environments, easily introducing new modules or extending existing ones to adapt to evolving business needs. By incorporating machine learning into the provisioning process, ERP module development benefits from enhanced efficiency, continuous improvement, agile deployment, self-optimization capabilities, enhanced stability and reliability, data-driven decision making, and an improved developer experience. As a result, faster development cycles, higher quality code, and improved system performance can be achieved.

In summary, the technologies described herein addresses the challenges of provisioning containerized ERP modules. Such technologies automate the setup process, optimize resource allocation, enhance security, ensure GDPR compliance, and facilitate scalability and agility. By leveraging container technology and machine learning, the technologies described herein provide a comprehensive and flexible framework for efficient and secure provisioning of ERP modules, empowering organizations to adapt quickly, drive innovation, and meet their business objectives.

Example 22—Example Computing Systems

Figure 10:
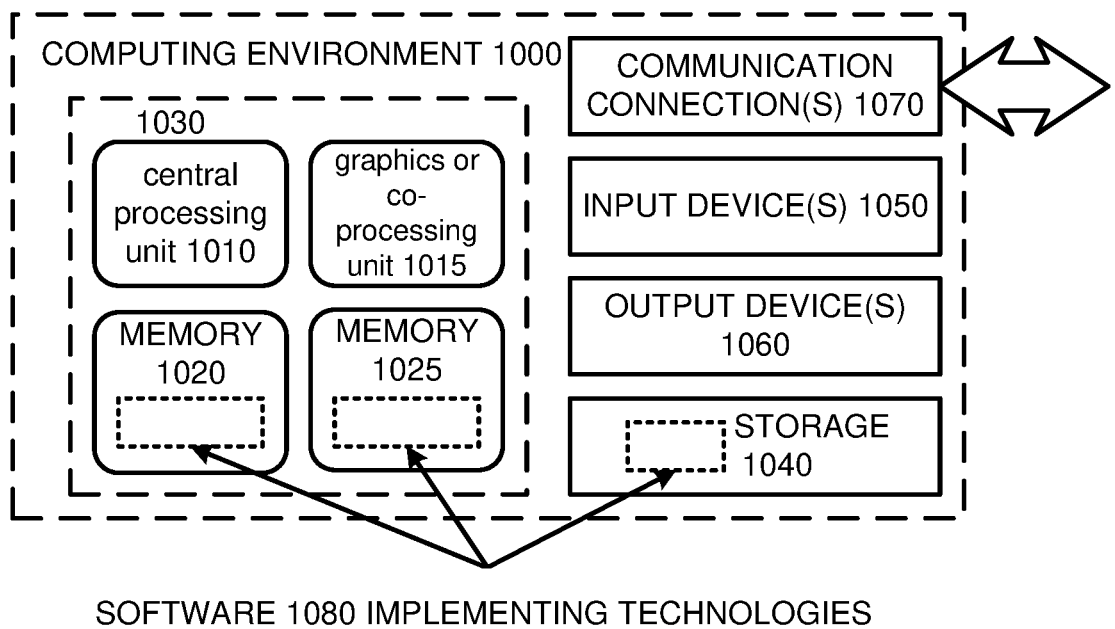
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 can have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 23—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 24—Example Cloud Computing Environment

Figure 11:
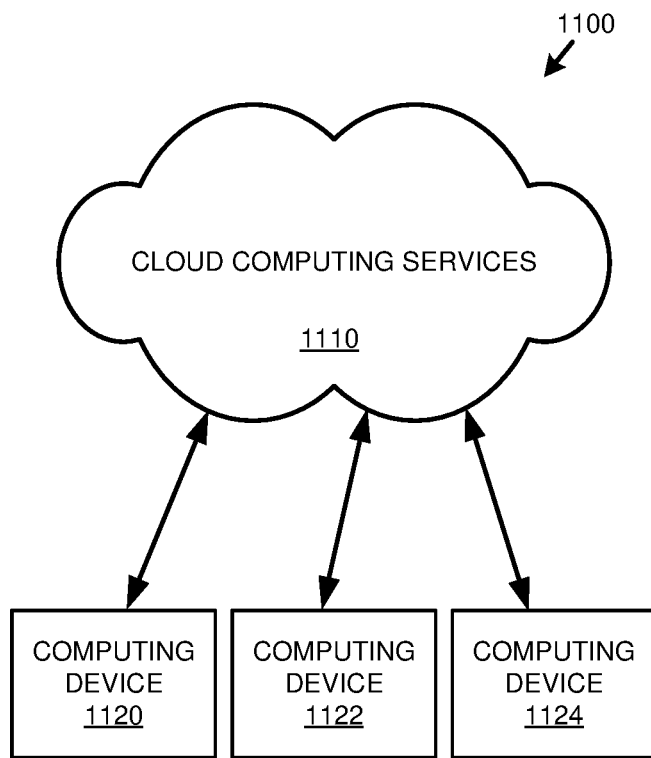
FIG. 11 is a block diagram of an example cloud computing environment that can be used in conjunction with the technologies described herein.

FIG. 11 depicts an example cloud computing environment 1100 in which the described technologies can be implemented, including, e.g., the computing environment 100 of FIG. 1 and other systems herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example 25—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 26—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
  obtaining a copy of a central development environment for a software system;
  creating a container image of the central development environment based at least in part on the copy;
  predicting dependencies between modules of the software system;
  verifying integrity of one or more of the modules of the software system;
  modifying the container image based at least in part on the predicted dependencies and the integrity verification; and
  generating an isolated development environment for development of a portion of the software system, wherein the generating comprises executing the modified container image.

2. The method of claim 1, wherein the prediction of the dependencies between the modules of the software system is performed using a first machine learning model, and wherein the verification of the integrity of the one or more modules of the software system is performed using a second machine learning model.

3. The method of claim 2, wherein the first machine learning model is a graph convolutional network (GCN)

model, and wherein predicting the dependencies between the modules of the software system using the GCN model comprises:
  collecting data regarding the software system;
  preparing the collected data for training;
  training the GCN model using the collected data;
  generating a graph of the software system; and
  applying the trained GCN model to the graph of the software system to predict the dependencies between the modules of the software system.

4. The method of claim 3, wherein the graph of the software system comprises a plurality of nodes and a plurality of edges, wherein the nodes represent the modules of the software system and the edges represent dependencies between the modules of the software system.

5. The method of claim 2, wherein the second machine learning model is an isolation forest model, and wherein verifying the integrity of the one or more modules of the software system comprises:
  collecting training data;
  training the isolation forest model using the training data; and
  inputting characteristics of a selected module to the trained isolation forest model to verify the integrity of the selected module.

6. The method of claim 5, wherein the training data comprises a dataset of example module images, wherein training the isolation forest model using the training data comprises analyzing a composition of the example module images with the isolation forest model, and wherein verifying the integrity of the selected module further comprises inputting a module image of the selected module to the trained isolation forest model.

7. The method of claim 2, further comprising generating a modernization recommendation using a third machine learning model, wherein the modification of the container image is further based on the modernization recommendation.

8. The method of claim 1, further comprising:
  generating additional isolated development environments for development of the portion of the software system; and
  managing versions of repositories and objects associated with the isolated development environments using an external code repository.

9. The method of claim 8, further comprising:
  with the external code repository, creating a plurality of branches within one or more of the isolated development environments.

10. The method of claim 8, further comprising:
  registering the repositories and objects associated with the isolated development environments using a transport system.

11. A computing system, comprising:
  at least one hardware processor;
  at least one memory coupled to the at least one hardware processor;
  a central development environment for a software system, the software system comprising a plurality of modules; and
  one or more non-transitory computer-readable media having stored therein computer-executable instructions that, when executed by the computing system, cause the computing system to perform:
    obtaining a copy of the central development environment;
    creating a container image based at least in part on the copy;
    predicting dependencies between the modules of the software system;
    performing integrity verification for one or more modules of the software system;
    modifying the container image based at least in part on the predicted dependencies and the integrity verification; and
    executing the modified container image to generate one or more isolated development environments.

12. The system of claim 11, wherein each isolated development environment is associated with a repository and one or more objects.

13. The system of claim 12, further comprising:
  an external code repository configured to manage versions of the repositories and objects associated with the one or more isolated development environments; and
  a transport system configured to register the repositories and objects associated with the one or more isolated development environments.

14. The system of claim 13, wherein:
  the external code repository is further configured to create a plurality of branches within the one or more isolated development environments.

15. The system of claim 11, further comprising:
  a first machine learning model trained with data regarding the software system; and
  a second machine learning model trained with data regarding characteristics of a selected module of the software system.

16. The system of claim 15, wherein:
  the predicting of the dependencies between the modules of the software system is performed using the first machine learning model; and
  the performing of the integrity verification for the one or more modules of the software system is performed using the second machine learning model.

17. The system of claim 16, wherein:
  the first machine learning model is a graph convolutional network (GCN) model; and
  the predicting of the dependencies between the modules of the software system using the GCN model comprises applying the GCN model to a graph of the software system comprising a plurality of nodes and a plurality of edges, the nodes representing the modules of the software system and the edges representing dependencies between the modules of the software system.

18. The system of claim 16, wherein:
  the second machine learning model is an isolation forest model; and
  the performing of the integrity verification for the one or more modules of the software system comprises inputting characteristics of a selected module and/or a module image of the selected module to the isolation forest model.

19. The system of claim 11, further comprising generating a modernization recommendation using a third machine learning model, wherein the modification of the container image is further based on the modernization recommendation.

20. One or more non-transitory computer-readable media comprising computer-executable instructions that, when executed by a computing system, cause the computing system to perform operations comprising:
  obtaining a copy of a central development environment for a software system;

creating a container image of the central development environment based at least in part on the copy;

predicting dependencies between modules of the software system by applying a graph convolutional network machine learning model to a graph of the software system;

verifying integrity of a selected module of the software system using an isolation forest machine learning model;

modifying the container image based at least in part on the predicted dependencies and the integrity verification; and generating an isolated development environment for the selected module, wherein the generating comprises executing the modified container image.

* * * * *